US 8,255,989 B2

(12) United States Patent
Medvinsky et al.

(10) Patent No.: US 8,255,989 B2
(45) Date of Patent: Aug. 28, 2012

(54) ACCESS CONTROL AND KEY MANAGEMENT SYSTEM FOR STREAMING MEDIA

(75) Inventors: Alexander Medvinsky, San Diego, CA (US); Petr Peterka, San Diego, CA (US); Paul Moroney, Olivehain, CA (US)

(73) Assignee: General Instrument Corporation, Horsham, PA (US)

( * ) Notice: Subject to any disclaimer, the term of this patent is extended or adjusted under 35 U.S.C. 154(b) by 1316 days.

(21) Appl. No.: 10/170,951

(22) Filed: Jun. 12, 2002

(65) Prior Publication Data
US 2003/0063752 A1    Apr. 3, 2003

Related U.S. Application Data

(63) Continuation-in-part of application No. 09/966,552, filed on Sep. 26, 2001.

(51) Int. Cl.
*G06F 7/04*    (2006.01)
(52) U.S. Cl. .......... 726/19; 726/7; 726/17; 713/186; 382/115
(58) Field of Classification Search .......... 726/9, 7, 726/17, 19; 713/194, 186; 382/115
See application file for complete search history.

(56) References Cited

U.S. PATENT DOCUMENTS
| | | |
|---|---|---|
| 5,029,208 A | 7/1991 | Tanaka |
| 5,455,953 A * | 10/1995 | Russell .......... 710/266 |
| 5,535,276 A | 7/1996 | Ganesan |
| 5,784,463 A | 7/1998 | Chen et al. |
| 6,002,768 A | 12/1999 | Albanese et al. |
| 6,088,796 A | 7/2000 | Cianfrocca et al. |

(Continued)

FOREIGN PATENT DOCUMENTS
EP    1041823 A    10/2000
(Continued)

OTHER PUBLICATIONS

Aura, Tuomas, "Distributed Access-Rights Management With Delegation Certificates," Secure Internet Programming (LNCS 1603), pp. 211-235, 1999.

(Continued)

*Primary Examiner* — Edan Orgad
*Assistant Examiner* — Roderick Tolentino
(74) *Attorney, Agent, or Firm* — Stewart M. Wiener

(57) ABSTRACT

A session rights object and authorization data are used for defining a consumer's access right to a media content stream. The access rights are determined at a caching server remotely located from the consumer rather than locally at the end user site. In a first aspect, in a computing network having a content provider, a key distribution center, a caching server and a client, a method for controlling client access to a real-time data stream from the caching server, is disclosed. The method includes receiving, by the client, a session rights object from a content provider, the session rights object defining access rules for accessing the real-time data stream; receiving, by the client, authorization data from the key distribution center, the authorization data defining the client's access rights to the real-time data stream; forwarding to the caching server the session rights object and the authorization data; comparing, by the caching server, the session rights object with the authorization data to determine client authorization; and if the client is authorized, streaming, by the caching server, the real-time data stream to the client.

10 Claims, 5 Drawing Sheets

U.S. PATENT DOCUMENTS

| | | | |
|---|---|---|---|
| 6,122,742 | A | 9/2000 | Young et al. |
| 6,189,146 | B1 | 2/2001 | Misra et al. |
| 6,289,382 | B1 | 9/2001 | Bowman-Amuah |
| 6,343,313 | B1 | 1/2002 | Salesky et al. |
| 6,389,541 | B1 * | 5/2002 | Patterson .................... 726/9 |
| 6,434,568 | B1 | 8/2002 | Bowman-Amuah |
| 6,591,250 | B1 | 7/2003 | Johnson et al. |
| 6,615,258 | B1 | 9/2003 | Barry et al. |
| 6,637,027 | B1 * | 10/2003 | Breslauer et al. ............. 725/25 |
| 6,807,277 | B1 | 10/2004 | Doonan et al. |
| 7,206,803 | B1 * | 4/2007 | Bendel et al. ................. 709/202 |
| 7,263,497 | B1 * | 8/2007 | Wiser et al. .................... 705/51 |
| 2001/0037465 | A1 * | 11/2001 | Hart et al. ..................... 713/201 |
| 2002/0029269 | A1 * | 3/2002 | McCarty et al. ............. 709/225 |
| 2002/0047899 | A1 | 4/2002 | Son et al. |
| 2002/0048368 | A1 * | 4/2002 | Gardner ....................... 380/277 |
| 2002/0049679 | A1 | 4/2002 | Russell et al. |
| 2002/0099948 | A1 * | 7/2002 | Kocher et al. ................. 713/194 |
| 2002/0133699 | A1 | 9/2002 | Pueschel |
| 2002/0141590 | A1 * | 10/2002 | Montgomery ............... 380/277 |
| 2002/0172368 | A1 | 11/2002 | Peterka |
| 2003/0005144 | A1 | 1/2003 | Engel et al. |
| 2003/0033302 | A1 * | 2/2003 | Banerjee et al. ................. 707/6 |
| 2003/0046238 | A1 | 3/2003 | Nonaka et al. |
| 2003/0236745 | A1 | 12/2003 | Hartsell et al. |
| 2004/0004805 | A1 | 1/2004 | Jerding et al. |
| 2005/0216731 | A1 | 9/2005 | Saito et al. |

FOREIGN PATENT DOCUMENTS

| | | |
|---|---|---|
| EP | 1041823 A2 | 10/2000 |
| EP | 1 089 488 A1 | 4/2001 |
| WO | WO 00/11849 A1 | 3/2000 |
| WO | WO 01/56249 A1 | 8/2001 |
| WO | 0198903 A1 | 12/2001 |
| WO | WO 01/98903 A1 | 12/2001 |
| WO | WO 01/99374 A2 | 12/2001 |
| WO | WO 01/99374 A3 | 12/2001 |
| WO | 0211358 A2 | 2/2002 |
| WO | WO 02/45316 A2 | 6/2002 |
| WO | WO 02/084980 A1 | 10/2002 |
| WO | WO 03/045036 A2 | 5/2003 |

OTHER PUBLICATIONS

Christin, Nicolas, "Multicasting of Real-Time Data RTP, RTCP, RTSP," 43 pages, Nov. 9, 1999.
Ganesan, Ravi, "Yaksha: Augmenting Kerberos With Public Key Cryptography," IEEE. pp. 132-143, 1995.
Kohl, J et al., "The Kerberos Network Authentication Service (V5)," 97 pages, Sep. 1993.
Maughan, D. et al., "Internet Security Association And Key Management Protocol (ISAKMP)," The Internet Society, 81 pages, Nov. 1998.
Schulzrinne, H. et al., "RTP: A Transport Protocol For Real-Time Applications," 75 pages, Jan. 1996.
Office Action, Korean App. No. 10-2004-7004467 (Foreign Text), Aug. 11, 2009.
Office Action, Korean App. No. 10-2004-7004467 (English Translation), Aug. 27, 2009.
Office Action, U.S. Appl. No. 10/194,922, Nov. 6, 2006.
Office Action, Mexican App. No. PA/a/2004/12326 (Foreign Text and Summary Translation), Jan. 29, 2007.
Office Action, U.S. App. No. 10/194,922, Feb. 21, 2006.
Office Action, Mexican App. No. PA/a/2004/12326 (Foreign Text and Summary Translation), Apr. 16, 2008.
Office Action, Canadian App. No. 2,488,844, May 22, 2008.
Office Action, Chinese App. No. 03813791.7 (Foreign Text and English Translation), Aug. 15, 2008.
Office Action, Canadian App. No. 2,488,844, Jun. 14, 2005.
Office Action, Mexican App. No. PA/a/2004/12326 (Foreign Text and Summary Translation), Jan. 26, 2009.
Office Action, Korean App. No. 10-2004-7004467 (Foreign Text and English Translation), Feb. 17, 2010.
Office Action, Canadian App. No. 2,488,844, Jul. 19, 2010.
Office Action, Canadian App. No. 2,488,844, Apr. 4, 2011.

* cited by examiner

ACCESS CONTROL AND KEY MANAGEMENT SYSTEM FOR STREAMING MEDIA

CROSS-REFERENCES TO RELATED APPLICATIONS

This application is related to the following U.S. non-provisional applications, U.S. patent application Ser. No. 10/194,922, entitled "KEY MANAGEMENT INTERFACE TO MULTIPLE AND SIMULTANEOUS PROTOCOLS" filed Jul. 12, 2002; U.S. patent application Ser. No. 10/092,347, entitled "KEY MANAGEMENT PROTOCOL AND AUTHENTICATION SYSTEM FOR SECURE INTERNET PROTOCOL RIGHTS MANAGEMENT ARCHITECTURE" filed Mar. 4, 2002; U.S. patent application Ser. No. 10/183,130, entitled "ENCRYPTION OF STREAMING CONTROL PROTOCOLS AND THEIR HEADERS" filed Jun. 25, 2002; U.S. patent application Ser. No. 09/966,552, entitled "UNIQUE ON-LINE PROVISIONING OF USER SYSTEMS ALLOWING USER AUTHENTICATION" filed Sep. 26, 2001; and U.S. patent application Ser. No. 10/153,445, entitled "ASSOCIATION OF SECURITY PARAMETERS FOR A COLLECTION OF RELATED STREAMING PROTOCOLS: RTP, RTSP, RTCP" filed May 21, 2002, all of which are hereby incorporated by reference in their entirety as set forth in full in the present invention, for all purposes.

BACKGROUND OF THE INVENTION

The present invention relates generally to the field of data communication and more specifically to rights management and securing data communicated in a network.

A growing interest in streaming distribution of multimedia content over Internet Protocol (IP) networks has resulted in a growing need for key management systems. One such streaming distribution system is the Aerocast Network™ developed by Aerocast, Inc. of San Diego, Calif. As discussed with reference to FIG. 1, although the existing phase 1 Aerocast Network facilitates delivery of content, it lacks security and key management for the network.

FIG. 1 is a block diagram of a network 100 (by Aerocast) for facilitating streaming of content over a communication network.

Among other components, network 100 includes a content provider 102 for generating content intended for a consumer 116, Internet 114 through which content is streamed, and a central server 104 to which content provider 102 publishes its contents. Central server 104 contains a database 108 for storing content information, and a search engine 110 for searching database 108. Network 100 further comprises a provisioning center 106, and caching servers 112, 113 and 115.

In operation, consumer 116 wishing to access content by content provider 102, streams the content from the closest caching server, in this case, caching server. 115. In conventional systems without caching servers, consumer 116 desiring such content streams obtains content directly from content provider 102. Not only does this result in poor content quality, delays associated with inadequate bandwidth may result. By using the caching servers, network 100 avoids disadvantages associated with direct streaming of digital content from content provider 202. Caching servers 112, 113 and 115 may be local DSL (digital subscriber line) providers, for example.

Network 100 provides a further advantage. When searching for content, consumer 116 need not search any and all databases on Internet 114. All content providers (including content provider 102) on network 100 publish descriptions of their content to a single central database 108. For video content for example, such descriptions may include the movie name, actors, etc. In this manner, when content is desired, consumer 116 uses search engine 110 to search database 108. When the content is found, database 108 thereafter provides a link to content provider 202 having the desired content. Content provider 102 is then accessed by consumer 116 to access the desired content in more detail. Such details include pricing information, etc.

A mechanism is provided whereby consumer 116 provides a list of caching servers closest to it to content provider 102. In response to consumer 116's request, content provider 102 selects the appropriate caching server closest to consumer 116 for streaming the content. It should be observed, however, that in today's Aerocast network content is streamed in the clear by network 100. Disadvantageously, because it is unprotected, the content may be intercepted by an unauthorized consumer resulting in substantial losses to content providers and consumers.

Some disadvantages of network 100 are resolved by the aforementioned related patents, commonly owned and hereby incorporated by reference as if set forth in their entirety in the present specification.

Cable key management systems typically employ messages known as ECMs (entitlement control messages) and EMMs (entitlement management messages) to control access to data streams. EMMs are control messages that convey access privileges to subscriber terminals. Unlike ECMs (entitlement control messages) which are embedded in transport multiplexes and are broadcast to multiple subscribers, EMMs are sent unicast-addressed to each subscriber terminal. That is, an EMM is specific to a particular subscriber.

In many cases, however, EMMs and ECMs are delivered to set-top boxes at the end-user for evaluation. The set-top box location makes it relatively easier for unauthorized users to access and modify EMM and ECM messages. Even where location is no problem, using EMMs and ECMs for software clients can be less secure. Unlike hardware set-top boxes, software code is more readily reversed engineered to provide users with unauthorized access to content.

Therefore, there is a need to resolve one or more of the aforementioned problems, and the present invention meets this need.

BRIEF SUMMARY OF THE INVENTION

The present invention provides a session rights object and authorization data for determining whether content is accessible to a consumer. Access rights are determined at a caching server remotely located from the consumer, although such rights may be determined at the consumer site or third party locations.

According to a first aspect, this invention is a method for controlling client access to real-time data streams obtained from a caching server. Authorization data is provided to the client for accessing the real-time data stream. The authorization data may be generated at a key distribution center, for example. Or, it may come from any trusted third party authenticator. The authorization data defines subscription options selected by the client, such as, subscribed services, and a user payment method (e.g. by credit card or via a monthly bill). Other pertinent authorization information such as geographical location may be included as well.

A session rights object is also provided to the client for accessing the data stream. This object may contain generic access rights for specific content. These access rights are independent of the client requesting the content. Also, the session rights object may include purchase options selected by the user. Typically, such purchase options are provided by the content provider although they may be provided by other type entities. Note that although both the session rights object and authorization data are provided to the client, they cannot be modified by the client. The client simply presents this information to the caching server from which content is streamed.

Also, note that the authorization data need not be provided to the client. In such a case, the authorization data is sent directly from the key distribution center to the caching server. Similarly, the session rights object may be delivered directly from the content provider to the caching server. Or, the session rights object may be provided by a system remotely located from the caching server and the client.

When the client is ready for streaming, it forwards the authorization data and the session rights object to the caching server for evaluation. After receipt, the caching server then compares the session rights object and the authorization data, to determine whether the client is authorized to access the data stream. If the authorization data matches the session rights information, content is streamed from the caching server to the client. Note that the streaming session is secured by a session key provided by the caching server.

According to another aspect of the present invention, a method for controlling client access to data from a caching server in a communication network is disclosed. The method includes the steps of providing authorization data defining the client's subscription options for the real-time data stream, and providing a session rights object defining the client's selections from various purchase options. Other steps include comparing the session rights object with the authorization data to determine client authorization; and if the client is authorized, transferring the data to the client.

According to another aspect of the present invention, the session rights object contains any one or more geographic location black outs, purchase options and decisions for the real-time data stream and content identification. The authorization data may include client geographic location data, list of services subscribed by the client, and the client's ability to pay for the real-time data stream.

According to another aspect of the present invention, the session rights object contains any one or more geographic location black outs, purchase options and decisions for the real-time data stream and content identification. The authorization data may include client geographic location data, list of services subscribed by the client, and the client's ability to pay for the real-time data stream.

According to another aspect of the present invention, the content identification is an RTSP (real-time streaming protocol) URL (uniform resource identifier).

Figure 1:
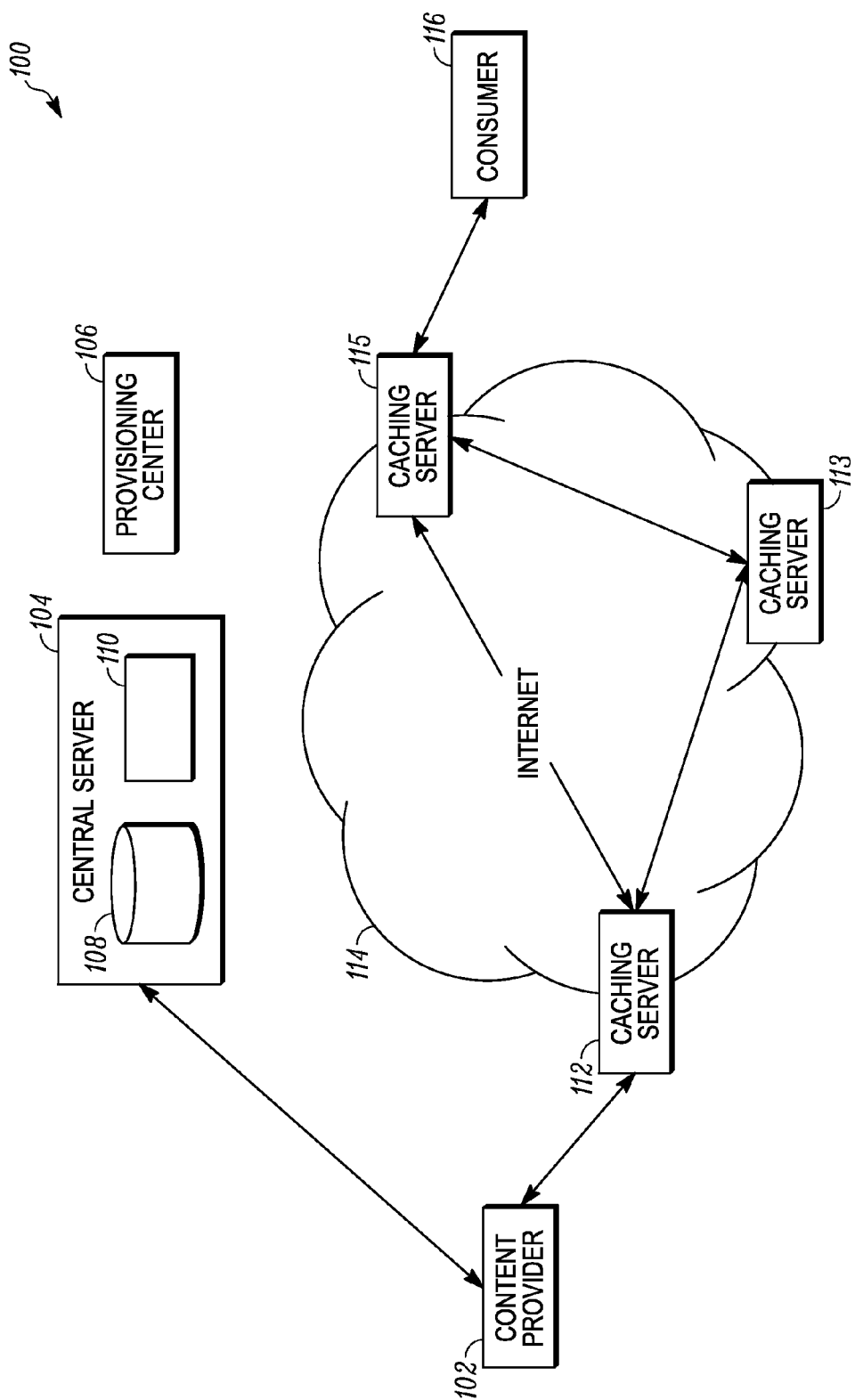
FIG. 1 is a block diagram of a network for facilitating streaming of content over a communication network.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, a first embodiment of the present invention provides a method for controlling client access to a real-time data stream from a caching server. The client and the caching server are registered with a KDC (Key Distribution Center) as IPRM (Internet Protocol Rights Management) principals. The real-time data stream is provided by a content provider also registered with the KDC.

When requested by a registered client, the KDC forwards to the client a ticket that the client may later use to authenticate to a specified caching server. As used herein, a ticket is an authentication token that is given out to a client by the KDC. Among other information, a ticket contains the name of the client, name of a specific server and a session key (a symmetric encryption key). This ticket also contains authorization data defining the client's subscription options. Authorization data may include subscribed services, geographical location, user payment method (e.g. by credit card or via a monthly bill) and other client information that may affect authorization for the real-time data stream.

When this client requests access to a real-time data stream, the client receives from a content provider a session rights object defining user selection and optionally content access rules for accessing the real-time data stream. In turn, the client forwards both the session rights object and the ticket with the authorization data to the caching server. The caching server compares the session rights object with the authorization data to determine client authorization; and if the client is authorized, the real-time data is streamed to the client.

Figure 2:
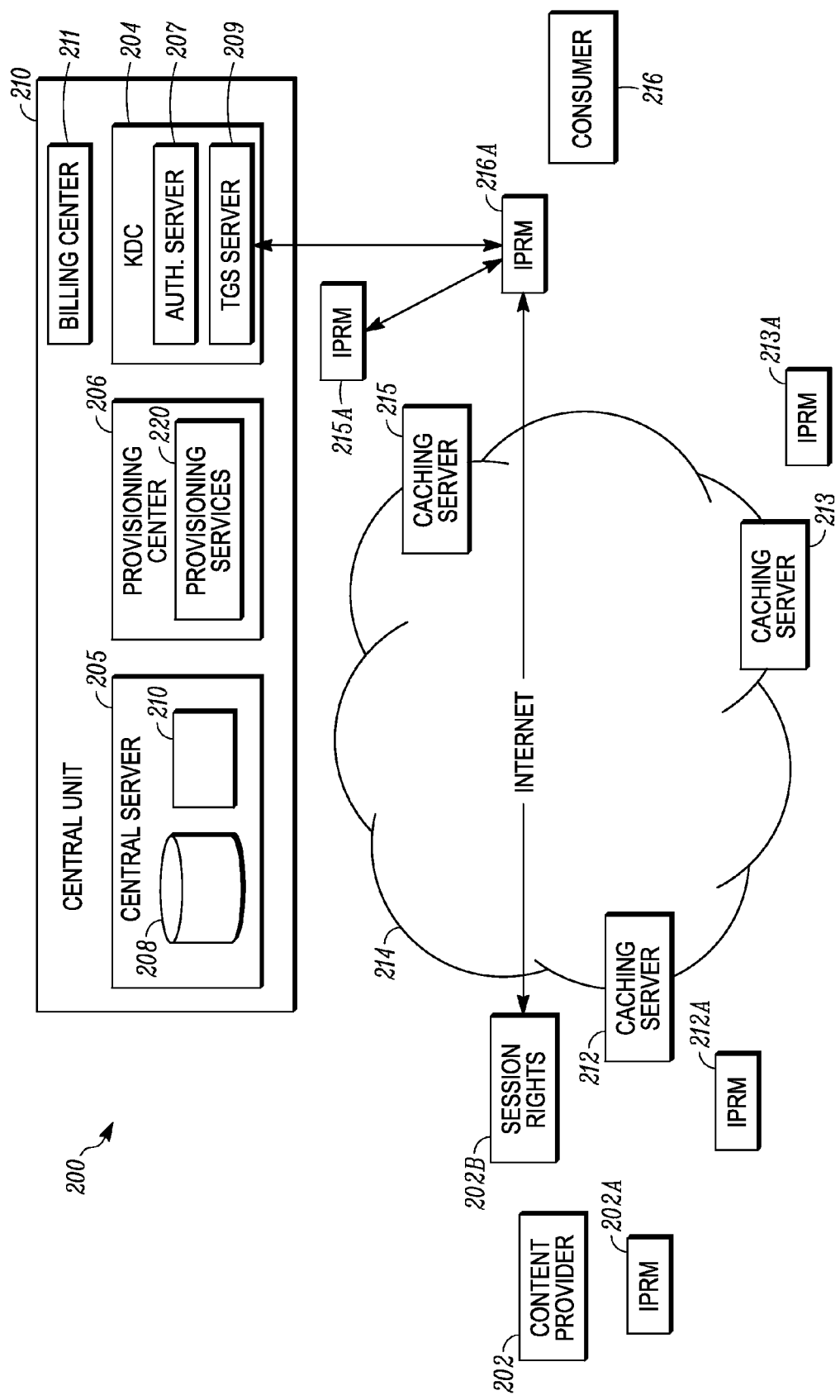
FIG. 2 is a block diagram of an IPRM (Internet protocol rights management) system incorporating the ES Broker™ protocol for applying key management and security to the network of FIG. 1 in accordance with an exemplary embodiment of the present invention.
Figure 3:
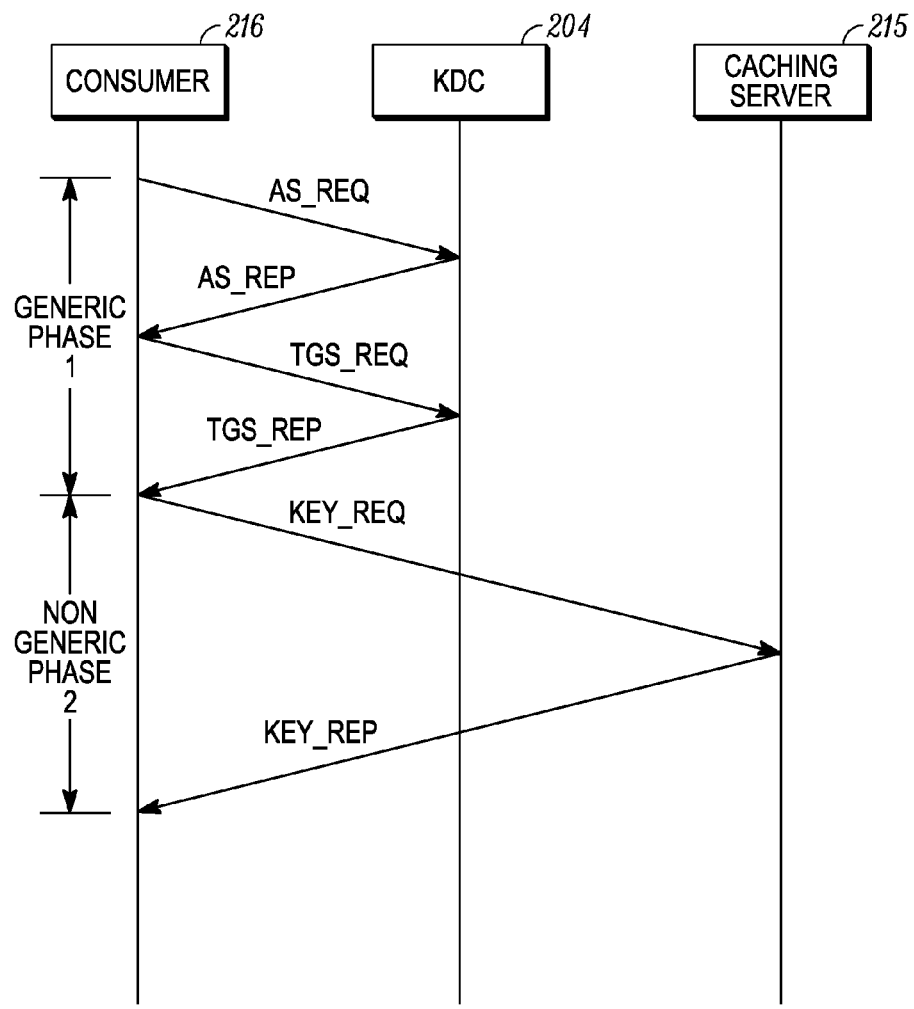
FIG. 3 is a high-level flow diagram of the security and key management protocol when key management is initiated by a consumer (client) to a caching server (server) in accordance with an exemplary embodiment of the present invention.
Figure 4:
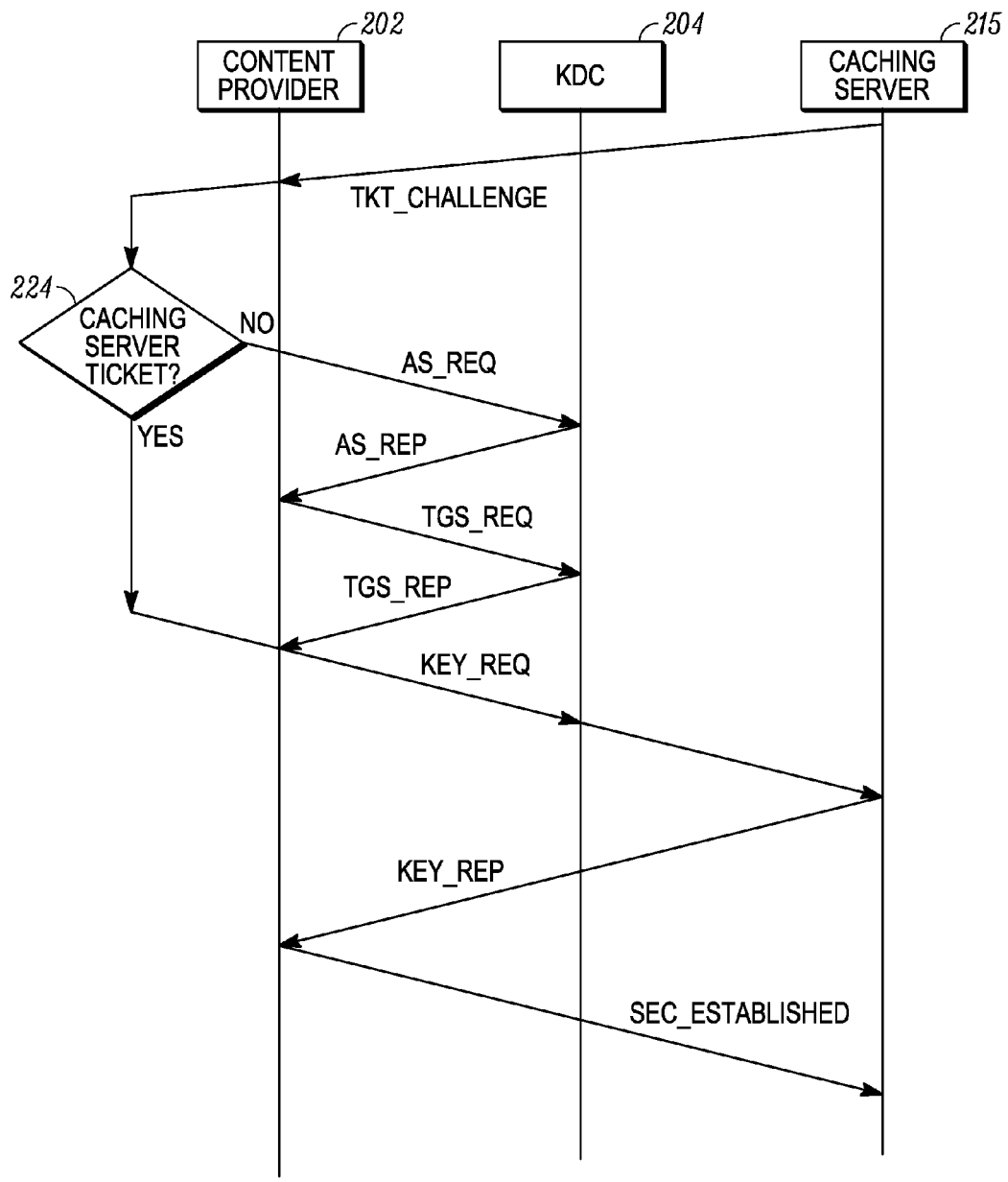
FIG. 4 is a high-level flow diagram of the security and key management protocol when key management is initiated from a caching server (server) to a content provider (client) in accordance with an exemplary embodiment of the present invention.
Figure 5:
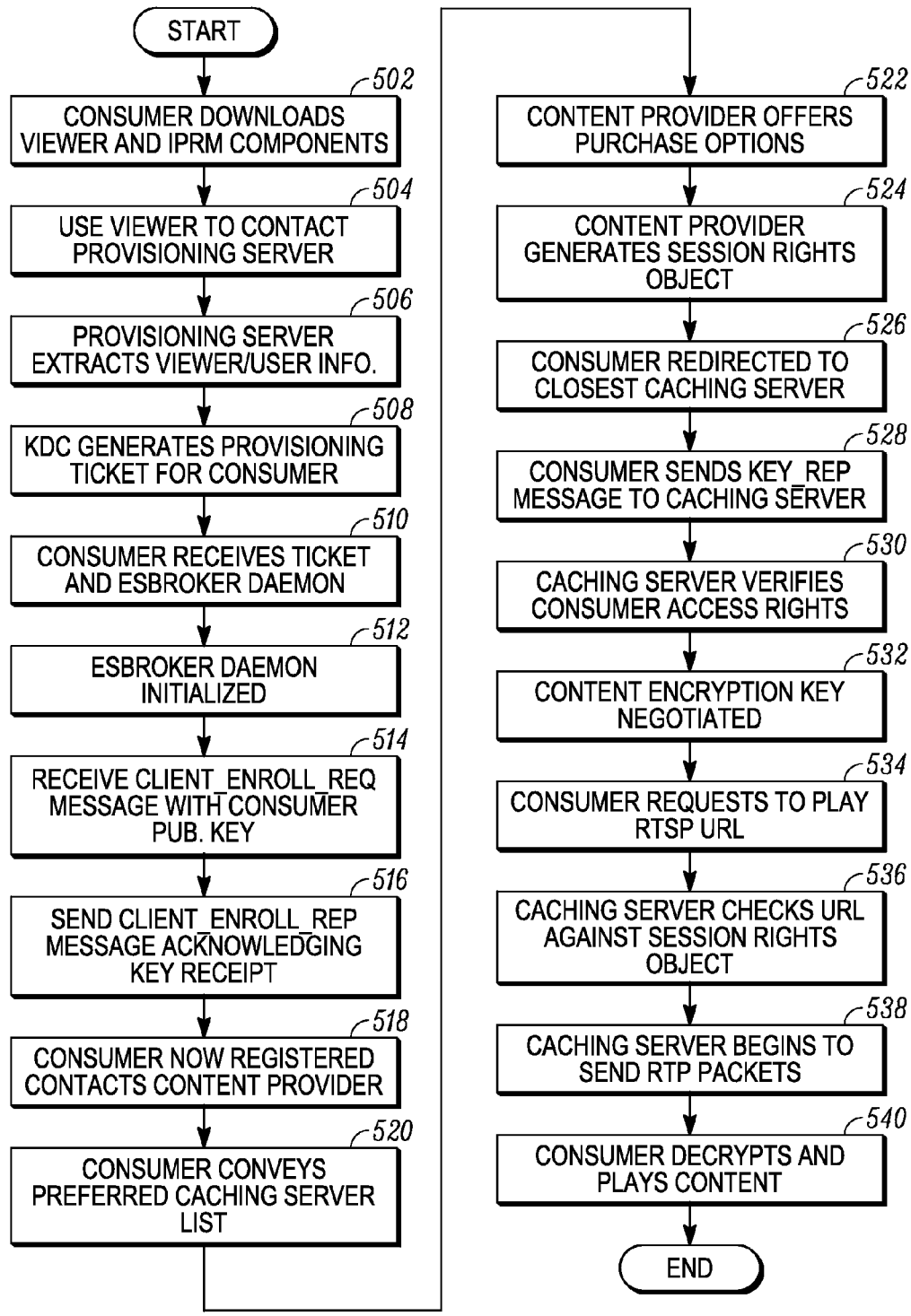
FIG. 5 is a block diagram illustrating initial registration and the receipt of content by a consumer in accordance with an exemplary embodiment of the present invention.

FIG. 2 is a block diagram of an IPRM (Internet protocol rights management) system 200 incorporating the ESBroker™ protocol for applying key management and security to network 100 of FIG. 1 in accordance with an exemplary embodiment of the present invention.

Among other components, IPRM system 200 comprises a content provider 202, consumer 216, Internet 214, a provisioning center 206, a central server 205 that contains both a database 208 and a search engine 210, caching servers 212, 213 and 215 all of which function in a similar manner to those of the corresponding components in FIG. 1. In addition, IPRM system 200 comprises a KDC (key distribution center) 204 containing an AS (authentication server) 207 for issuing a TGT (ticket granting ticket) to consumer 216, a TGS (ticket granting server) 209 for providing server tickets to access particular servers, a provisioning server 220, and a billing center 211. KDC 204, billing center 211, provisioning center 206 and central server 205 are all located within a central unit 218 for facilitating provision of services within IPRM system 200.

Further, IPRM system 200 contains an IPRM agent 202A for administering rights management for content provider 202, a session rights object 202B for defining user selection and optionally content rules for content to be streamed, an IPRM agent 212A for administering rights management for caching server 212, IPRM agent 213A for administering rights management for caching server 213, IPRM agent 215A for administering rights management for caching server 215, IPRM agent 216A for administering rights management for consumer 216, and a viewer (not shown) within consumer 216 for receiving desired content. Although not shown, the foregoing components may be located within their associated components. For example, IPRM agent 202A is locatable within content provider 202 rather than externally as shown.

As noted, IPRM system 200 generally functions to facilitate streaming of content in a secure fashion, to consumer 216 by using caching servers 212, 213 and 215. Content provider 202 provides content only once and thereafter it can be moved among the caching servers. The reason for the caching servers is to move the content closer to the edges of IPRM system 200. This improves the streaming performance and allows smaller content providers to sell their content without the need to buy expensive hardware for media streaming. It also allows introduction of an IP multicast (communication between a single sender and multiple receivers on a network) only at the caching servers. With current technology it is easier to have an IP multicast limited to a local access network than to have an IP multicast over the Internet.

The present invention in accordance with a first embodiment provides security to IPRM system 200 via KDC 204, IPRM agents 202A, 212A, 213A, 215A, and 216A. The IPRM agents in conjunction with KDC 204 and provisioning center 206 provide authentication, privacy, integrity and access control tools to all aspects of IPRM system 200. For example, before a consumer can utilize the system for streaming content, a registration process is required. Secure registration for the consumer is provided by IPRM system 200. Thus, during the registration process, no one else may replicate the identity of consumer 216 by intercepting messages between consumer 216 and KDC 204. KDC 204 is a trusted entity and provides key distribution to network components using a blend of symmetric and asymmetric algorithms.

KDC 204 and the IPRM components may be purely software protection, with a limited trust placed upon consumer 216, or may be hardware security modules, which may be mandatory to obtain rights to high quality content from copyright owners requiring high security levels, or may be a combination of both software and hardware. IPRM uses an authenticated key management protocol with high scalability to millions of consumers. The key management protocol is called ESBroker™ (Electronic Security Broker), a product of Motorola, Inc., San Diego Calif., will be referenced throughout this specification.

The ESBroker™ protocol partly based on the Kerberos framework consists of client interactions with the centralized Key Distribution Center (KDC 204) as well as with the individual application servers. A KDC client is any host that can send requests to the KDC. Within the IPRM system this includes consumers, caching servers and other IPRM system components. An application server is any server registered with the KDC for which a client might request a service ticket (e.g. caching server, Billing Center, etc.). The same host may be both a KDC client and an application server at the same time. For the IPRM system 200, the protocol employs a series of messages to accomplish key management between client and server interfaces of the system. This key management protocol is intended to be of general use for establishing secure sessions and is not restricted to the IPRM system. These messages listed in Table 1 below, are further described in the section entitled IPRM Protocol Messages.

TABLE 1

| Code | Message Type | Description |
| --- | --- | --- |
| 1 | CLIENT_ENROLL_REQ | Client enrollment request, containing client public key and other attributes |
| 2 | CLIENT_ENROLL_REP | Client enrollment reply from KDC 204, possibly containing a client certificate for the public key. |
| 3 | AS_REQ | Request Ticket Granting Ticket from the Authentication Server |
| 4 | AS_REP | Reply from Authentication Server with the TGT |
| 5 | TGS_REQ | Request service ticket from TGS server 209 |
| 6 | TGS_REP | Reply from TGS server 209 with the service ticket |
| 7 | TKT_CHALLENGE | Server requests this client to initiate key management |
| 8 | KEY_REQ | Key Management request from client |
| 9 | KEY_REP | Key Management reply from the application server |
| 10 | SEC_ESTABLISHED | An ACK from client to an application server stating that security is established |
| 11 | ESB_ERR | Error reply message |
| 12 | INIT_PRINCIPAL_REQ | Create a Provisioning Ticket for a specified principal. If the specified principal doesn't already exist, it will be initialized in KDC 204 database. |
| 13 | INIT_PRINCIPAL_REP | Returns a Provisioning Ticket for the specified principal. |
| 14 | DELETE_PRINCIPAL_REQ | Delete a specified ESBroker ™ principal from KDC 204 database. |
| 15 | DELETE_PRINCIPAL_REP | Acknowledgment to DELETE_PRINCIPAL_REQ |
| 16 | SERVICE_KEY_REQ | Application server requests a new service key from KDC 204. |
| 17 | SERVICE_KEY_REP | KDC 204 returns a new service key to the application server. |
| 18 | AUTH_DATA_REQ | KDC 204 requests authorization data for a particular principal. This may be part or all of the authorization data that will appear in a ticket that KDC 204 subsequently issues. |
| 19 | AUTH_DATA_REP | Authorization Server returns the data requested with AUTH_DATA_REQ. |

The KDC client sends its public key (symmetrically) signed with the provisioning key derived from the SKS by consumer 216. Since there is no access to the provisioning key within the provisioning ticket, consumer 216 derives the provisioning key from the SKS using a one-way function. The problem with distributing tickets and provisioning keys to software clients is that a software client may copy the ticket and key for forwarding to an unauthorized software client. To address this problem, consumer 216 receives the SKS instead of the actual provisioning key. Combining SKS with a unique host identifier using a one-way function generates the provisioning key. The SKS is specific to a particular host and can't be used anywhere else. In the present embodiment, consumer 216 executes the following function to reproduce the provisioning key:

Provisioning key=SKGen (Host ID, SKS)

Where SKGen ( ) is a one-way function; $SKGen^{-1}$( ) cannot be calculated within reasonable amount of time (e.g. in less than the ticket lifetime).

At block 516, upon receiving the CLIENT_ENROLL_REQ message, KDC 204 finds consumer 216 in its local database to verify the request. If the request is valid, KDC 204 stores the public key either in a client database that could be located locally on the KDC or at some other remote location with secure access. Alternatively, KDC 204 may generate a certificate with the public key for forwarding to consumer 216. A message CLIENT_ENROLL_REP acknowledging the key has been stored (or alternatively containing a client certificate) is then forwarded to consumer 216.

At block 518, consumer 216 is now enrolled and may contact a web site (not shown) with a database 208 having a listing of content from various providers including content provider 202. When the desired content is located, consumer 216 gets redirected to content provider 202.

At block 520, consumer 216 then contacts content provider 202 to which it was redirected and conveys its preferred list of caching servers, list of subscribed services, its ability to pay for content, etc.

At block 522, content provider 202 offers an optimized subset of purchase options that depend upon the context of the particular consumer and service. For example, price selection screens may be bypassed for consumers already subscribed to this service.

At block 524, content provider 202 generates a session rights object that encapsulates the purchase options selected by consumer 216, an optional set of content access rules (e.g., blackout regions) and a reference to the selected content. For example, a session ID which is a random number that was generated by consumer 216 when it requested these session sights from the content provider. An End Time after which these session rights are no longer valid, a ProviderID, PurchaseOption selected by consumer 216, etc.

At block 526, content provider 202 redirects consumer 216 to the appropriate caching server. In this case, content will be streamed from caching server 215 which is closest to consumer 216. If consumer 216 had previously cached a caching server ticket for caching server 215 when it signed up, it retrieves that ticket. If it has no cached ticket, it contacts KDC 204 using a TGT to obtain the correct caching server ticket.

At block 528, consumer 216 authenticates itself to caching server 215 using the caching server ticket, and at the same time (in the same KEY_message) forwards the session rights object obtained from content provider 202 to caching server 215. Communication between consumer 216 and caching server 215 is accomplished using the KEY_REQ/KEY_REP messages, above.

At block 530, caching server 215 checks the access rules from the session rights object against consumer 216's entitlements contained in the ticket and also against the user selection (purchase option selected by the consumer) in the session rights object The entitlements are basically authorization data specific to consumer 216 which allows access to content. The set of content access rules is optional because it might have been delivered directly to caching server 215 with the content. Furthermore, caching server 215 can optionally gather additional content access rules from multiple sources. For example, an access network provider (e.g. cable system operator) might impose some restrictions for delivery over its network.

At block 532, if access is approved, consumer 216 and caching server 215 negotiate a Content Encryption Key (CEK) for delivery of the content, or the caching server generates that key.

At block 534, consumer 216 starts issuing encrypted RTSP commands to the caching server 215 to get description of the content (RTSP URL) and then to request to play the content.

At block 536, caching server 215 receives RTSP commands, decodes them and returns encrypted RTSP responses. When an RTSP command requests to play a specific URL, caching server 215 verifies that the specified URL is what was specified in the session rights object for this secure session (identified by a Session ID).

At block 538, after receiving a request to play an RTSP URL, caching server 215 begins to send out encrypted RTP packets and both caching server 215 and consumer 216 periodically send encrypted RTCP report packets. All RTP and RTCP packets associated with the same RTSP URL are encrypted using the same Session ID, the Session ID that was recorded when caching server 215 started receiving encrypted RTSP messages from consumer 216.

At block 540, consumer 216 decrypts and plays the content. At the same time, consumer 216 may issue additional RTSP commands (e.g. to pause or resume content play out), still encrypted using the same Session ID. Caching server 215 keeps track of who viewed the content, how long the content was viewed, and under what mechanism the content was purchased. This information is then used for billing purposes, whether directed to consumer 216 or to the advertiser. Advantageously, the present system allows an effortless transition through multiple content from various providers and with billing information such as a credit number entered only once. When content is requested, information about consumer is being transmitted transparently to the content provider. The consumer experience is relatively effortless because multiple access codes need not be remembered.

Media Stream Key Management

Media stream key management uses the ESBroker™ key management protocol specific to IPRM. A DOI_ID (domain of interpretation identifier) used in the KEY_REQ message is set to IPRM_DOI_ID value (see Table 6 below). Besides the DOI_ID value, there are a number of other application specific parameters and requirements that are IPRM-specific. These are listed in the sections below.

TABLE 6

| DOI_ID Name | DOI_ID Value | Description |
| --- | --- | --- |
| IPRM_DOI_ID | 1 | DOI ID for IPRM Key Management |

The ESBroker™ messages can optionally carry an ESB-Authenticator (ESBroker™ Authenticator) corresponding to a DOI object. This authenticator is useful in the case that the originator of the DOI object is not the sender of the ESBroker™ message, but some other $3_{rd}$ party. For media stream security, in some cases such an authenticator is required, while in other cases it is not.

IPRM DOI objects contain a session rights object or session ID—a random number that uniquely identifies a point-to-point secure session. Session ID generation does not require a strong random number generator—any software-based pseudo-random generator is sufficient. When one of the endpoints generates the session ID, it insures that it is unique for that host. Whenever a Session ID collision is detected, the endpoint where the collision occurred may return an application error code and the endpoint that generated this Session ID will generate another random value and retry. Note that normally the DOI object is encrypted inside the KEY_REQ or KEY_REP message.

Type 1 IPRM DOI Object (Session Rights)

The type 1 DOI Object (Session Rights) is normally sent with the KEY_REQ message when consumer 216 wishes to request a secure session from the caching server to view a program. The session rights are obtained by consumer 216 from content provider 202. Consumer 216 (viewer software) then places this DOI Object inside the KEY_REQ message, which is later validated by the appropriate caching server. The session rights are accompanied by an ESBAuthenticator such that the caching server may verify that it was content provider 202 that generated this authenticator.

Table 7 below lists examples of access rules and user selection. These rules and selections may be arbitrarily complex and may be expressed in different formats including TLV (Type-Length-Value) encoding, XML, etc. Note that the purchase option is independent of user selection.

TABLE 7

| Attribute | Description |
| --- | --- |
| DOI_Type | Must be set to DOI_TYPE_1. |
| Pvno | Protocol version number. Must be set to 1. |
| Session ID | A random number that was generated by the viewer when it requested these Session Rights from the content provider. The viewer may verify that it is the same. This same Session ID will be used to identify a secure streaming session, once the key management is complete and all the security parameters are established. The same security parameters with this Session ID will be applied to RTP, RTCP and RTSP protocols associated with the same streaming session. |
| EndTime | Time after which these session rights are no longer valid. |
| ProviderID | Content Provider principal name |
| ContentID | This is the RTSP URL. The Caching Server should save this RTSP URL and associate it with the Session ID. It will later be used to verify the RTSP URL that is requested via the RTSP protocol |
| PurchaseOption | Purchase option selected by consumer 216. |
| PurchasePrice | The purchase price of the content. It's meaning may depend on the Purchase Option (e.g. for PPV, it is the cost of the movie; for PBT, it is the cost of the purchasable time increment). |
| CountryBlackout | Restriction of distribution of this content to a specific country. |
| GeographicBlackout | Restriction of distribution of this content to a specific geographic area. |
| SubscriptionIdentification | List of Service IDs under which this content is offered for subscription |

In summary, the present invention discloses a method for controlling client access to data provided by a caching server. The method includes provision of certain authorization data for that defines the client's subscription options for the real-time data stream. Also provided is a session rights object that defines the client's selections from one or more purchase options. The session rights object is compared with the authorization data to determine client authorization, wherein the data is streamed to the client if the client is authorized.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. In a communication network, a method for controlling access by a client to a data stream from a caching server, the method comprising:
receiving, from a Key Distribution Centre (KDC), authorization data generated at the KDC, the authorization data including at least one subscription option selected by the client for the data stream;
receiving, from a content provider, a session rights object generated by a content provider, the session rights object including at least one purchase option selected by the client for the data stream, and at least one rule that governs access by the client to the data stream, wherein the session rights object cannot be modified by the client;
comparing, by the caching server, the session rights object and the authorization data to determine whether the client is authorized to access the data stream, based on comparing the at least one rule against the authorization data, and based on comparing the at least one rule against the at least one purchase option; and
transferring a decryption key data and an encrypted data stream to the client when the client is authorized to access the data stream.

2. The method of claim 1, wherein the encrypted data stream is a real-time data stream from the caching server to the client.

3. A method for controlling access by a client to a real-time data stream from a caching server located within a computing network, the method comprising:
receiving authorization data generated at a key distribution center, the authorization data including at least one subscription option selected by the client for accessing the real-time data stream;
receiving a session rights object generated by a content provider, the session rights object including at least one purchase option selected by the client for accessing the real-time data stream, and at least one rule that governs access by the client to the real-time data stream, wherein the session rights object cannot be modified by the client;
forwarding, by the client, the session rights object and the authorization data to the caching server; and
receiving a decryption key data and an encrypted real-time data stream when a comparison, performed by the caching server, of the session rights object and the authorization data determines, based on comparing the at least one rule against the authorization data, and based on comparing the at least one rule against the at least one purchase option, that the client is authorized to access the real-time data stream.

4. The method of claim 3, wherein said at least one subscription option selected by the client comprises any one or more of client geographic location data, list of services subscribed by the client, subscription identification, and the client's ability to pay for the real-time data stream.

5. The method of claim 1, wherein said at least one purchase option selected by the client include pay per view, pay per time, and number of viewings.

6. The method of claim 3, wherein the session rights object contains any one or more geographic location black outs, purchase options for the real-time data stream, and content identification.

7. The method of claim 6, wherein the content identification is a URI (uniform resource identifier).

8. A system for controlling access by a client system to a real-time data stream from a caching server located within a computing network, the system comprising:
   the client system further comprising at least a first processor configured to perform steps of:
      receiving, from a content provider, a session rights object that includes at least one purchase option selected by the client system for the real-time data stream, and at least one rule that governs access by the client system to the real-time data stream, wherein the session rights object cannot be modified by the client;
      receiving authorization data, from a Key Distribution centre (KDC), that includes at least one subscription option selected by the client system for the real-time data stream;
      forwarding the session rights object and the authorization data; and
      receiving a decryption key data and an encrypted real-time data stream; and
   the caching server further comprising at least a second processor configured to perform steps of:
      receiving the session rights object and the authorization data;
      comparing the session rights object and the authorization data to determine, based on comparing the at least one rule against the authorization data, and based on comparing the at least one rule against the at least one purchase option, whether the client system is authorized to access the real-time data stream; and
      transmitting a decryption key data and the encrypted real-time data stream to the client system when the client system is authorized to access the real-time data stream.

9. The system of claim 8, further comprising:
the KDC further comprising at least a third processor configured to perform steps of:
   generating the authorization data; and
   forwarding the authorization data to the client system.

10. The method of claim 8, further comprising:
a content provider further comprising at least a third processor configured to perform steps of:
   generating the session rights object; and
   forwarding the session rights object to the client system.

* * * * *